United States Patent [19]

Hirayama

[11] Patent Number: 5,838,520
[45] Date of Patent: Nov. 17, 1998

[54] MAGNETIC RECORDING/REPRODUCING APPARATUS WITH TILTING HEAD DRUM FOR DYNAMIC TRACKING

[75] Inventor: Hiromichi Hirayama, Yokohama, Japan

[73] Assignee: Victor Company of Japan, Ltd., Tokyo, Japan

[21] Appl. No.: 902,166

[22] Filed: Jul. 29, 1997

[30] Foreign Application Priority Data

Jul. 31, 1996 [JP] Japan .................................. 8-217850

[51] Int. Cl.⁶ .................................................. G11B 5/588
[52] U.S. Cl. ..................................... 360/109; 360/130.24
[58] Field of Search ............................... 360/84, 85, 109, 360/130.2–130.24, 107

[56] References Cited

U.S. PATENT DOCUMENTS

| | | | |
|---|---|---|---|
| 4,703,370 | 10/1987 | Inque et al. ................................ | 360/109 |
| 4,833,562 | 5/1989 | Kochi et al. ......................... | 360/130.24 |
| 4,977,473 | 12/1990 | Arai et al. ........................... | 360/130.24 |
| 5,067,035 | 11/1991 | Kudelski et al. ........................... | 360/85 |
| 5,502,607 | 3/1996 | Ushiro et al. ....................... | 360/130.24 |
| 5,504,642 | 4/1996 | Kinjo et al. ............................... | 360/109 |
| 5,675,458 | 10/1997 | Kinjo et al. ............................... | 360/109 |
| 5,726,836 | 3/1998 | Kinjo et al. ............................... | 360/109 |
| 5,742,456 | 4/1998 | Kinjo et al. ................................. | 36/109 |

FOREIGN PATENT DOCUMENTS

| | | |
|---|---|---|
| 0 589 726A | 3/1994 | European Pat. Off. . |
| 58-215758 | 12/1983 | Japan . |
| 01 118257 | 10/1989 | Japan . |

Primary Examiner—Jefferson Evans
Attorney, Agent, or Firm—Michael N. Meller

[57] ABSTRACT

Magnetic recording/reproducing apparatus has a lower drum, an upper drum equipped with a rotary magnetic head and being coaxially and rotatably supported by the lower drum, a first tilt driving device for tilting a center axis of the upper and lower drums at a predetermined angle to allow a rotary locus of the rotary magnetic head to coincide with a recorded track on a magnetic tape, a lead ring having a first tape positional regulation surface for guiding a reference edge of the magnetic tape, the lead ring being independently provided close to an outer peripheral surface of a small diameter section of the lower drum, and a second tilt driving device for tilting the lead ring to allow the first tape positional regulation surface thereof to match the reference edge of the magnetic tape. The apparatus has a constructive feature that a second tape positional regulation surface is at least provided at an end of a tape contacting area in a tape inlet side of the lower drum for guiding the reference edge of the magnetic tape running at the highest magnification speed in a trick play reproduction mode with respect to a tape speed of a normal recording.

2 Claims, 10 Drawing Sheets

MAGNETIC RECORDING/REPRODUCING APPARATUS WITH TILTING HEAD DRUM FOR DYNAMIC TRACKING

BACKGROUND OF THE INVENTION

1. Field of the Invention

The present invention relates to an improvement of a magnetic recording/reproducing apparatus, and particularly, relates to a magnetic recording/reproducing apparatus with a tilting head drum for dynamic tracking in which rotary magnetic heads can reliably trace recorded tracks on a magnetic tape by changing a spatial positional relation between a rotary locus plane of the rotary magnetic heads and the magnetic tape in response to a change of running speed of the magnetic tape running along a portion of a peripheral surface of the drum in contact therewith.

2. Description of the Related Art:

A typical example of the magnetic recording/reproducing apparatus which performs a recording/reproducing operation by helically scanning a magnetic tape running at a certain speed along a peripheral surface of a drum composed of upper (rotary) and lower (stationary) drums in contact with a portion of the peripheral surface with rotary magnetic heads (referred to as magnetic heads, hereinafter) may be a video tape recorder (referred to as VTR, hereinafter) or a video cassette recorder (referred to as VCR, hereinafter).

It is usual that the VTR or VCR of this type is provided with, in addition to a function of a normal reproduction in which recorded information is reproduced while running a magnetic tape at the same speed as that used in a normal recording operation, functions of the so-called variable speed reproduction (referred to as trick play reproduction mode, hereinafter) in which a reproduction is performed while running a magnetic tape at a speed (including stopping) different from the magnetic tape speed used in the recording operation, in a tape running direction which may be different from the tape running direction in the normal recording operation.

However, a recorded pattern formed on the magnetic tape by the rotary loci of the magnetic heads in the above-mentioned helical scanning type magnetic recording/reproducing apparatus is determined by various factors such as a diameter of the drum, a rotary speed and direction of the magnetic heads, a running speed and direction of the magnetic tape, an angle and width of tracks and a recording area on the magnetic tape. Thus, the rotary loci of the magnetic heads come to change on the magnetic tape by an alternation of an operation mode (a normal reproduction mode or various kinds of trick play reproduction modes).

For instance, for a VTR of VHS standard (industry standard system), it is general that the magnetic heads provided on the rotary drum having a diameter of 62 mm are rotated at a rotational speed of 1800 rpm in a standard mode (referred to as SP mode) while the magnetic tape helically wound around the rotary drum is transported at a speed of 33.35 mm/sec. in a normal direction (a tape running direction in the normal recording) so as to be recorded or reproduced. In this state, angles of the loci recorded on the magnetic tape by the magnetic heads become 5° 58' 9.9" with respect to a reference edge of the magnetic tape. Further, in the VTR, the angles of loci of the magnetic heads becomes 6° 2' 19.2" with respect to the edge of the magnetic tape when the magnetic heads on the rotary drum having 62 mm are rotated at a rotational speed of 1800 rpm, while the magnetic tape is transported in the normal direction at a speed of 66.7 mm/sec (double speed of the SP mode).

In addition, in the above VTR, the angles of loci of the magnetic heads become 5° 54' 6.2" with respect to the reference edge of the magnetic tape when the magnetic heads on the rotary drum having 62 mm are rotated at a rotational speed of 1800 rpm, while the magnetic tape is transported in an opposite direction of the normal direction at the speed of 66.7 mm/sec (double speed of the SP mode). Further, in the VTR, the angles of loci of the magnetic heads become 5° 56' 7.4" with respect to the edge of the magnetic tape when the magnetic heads on the rotary drum having 62 mm are rotated at a rotational speed of 1800 rpm, while the magnetic tape wound around the rotary drum is made stationary.

Accordingly, it is clear that the track pattern recorded on the magnetic tape in the SP mode intersects the loci of the magnetic heads on the magnetic tape in the trick play reproduction mode.

Therefore, a signal level of an FM signal reproduced in the trick play reproduction mode is considerably changed every time when the magnetic heads intersect the recorded tracks. Due to this fact, an image reproduced in the trick play reproduction mode contains noise and is low in quality.

Further, there are various digital VTRs for home use which have been proposed recently, in which an image signal is recorded by compressing an amount of data thereof by using the high efficiency recording system. When, in such digital VTR, the magnetic heads perform a reproduction such as a fast forward reproduction (referred to as FF reproduction hereinafter) or a fast backward reproduction (referred to as FB reproduction hereinafter) in which the magnetic heads cross recorded tracks of a magnetic tape, an image reproduction may become completely impossible dependent on orientation of data blocks arranged in a mosaic.

In order to solve such problem, it is enough to make the loci of the magnetic heads coincident with the recorded tracks on the magnetic tape T. In order to realize this, the following methods have been proposed:

(1) Magnetic heads are mounted on an electro-mechanical transducer as an actuator and the magnetic heads are displaced in a direction intersecting the recorded tracks of the magnetic tape by controlling the electro-mechanical transducer by means of an open or closed loop control circuit so that the magnetic heads follow the recorded tracks;

(2) As disclosed in, for instance, Japanese Utility Model Publication No. 63-34126/1988 and Japanese Utility Model Laid-open Publication No. 61-158633/1986, a rotary drum on which magnetic heads are mounted and a lower drum are integrally tilted so that the magnetic heads follow the recorded tracks of the magnetic tape: and (3) As disclosed in, for example, Japanese Patent Publication No. 61-22378/1986, heights of tape guides for defining a height of the magnetic tape, which are provided nearby a tape inlet side and a tape outlet side of a drum, are changed so that the magnetic heads follow the recorded tracks of the magnetic tape, in addition, guide surfaces for guiding a reference edge of the magnetic tape are provided at both the tape inlet side and the tape outlet side of a drum assembly to allow the high speed running of the magnetic tape.

However, in the VTR employing the above method (1), the electro-mechanical transducer must be provided in a small space within the rotary drum and, therefore, the electro-mechanical transducer must be small in size and compact in shape. It is difficult to sufficiently displace the magnetic heads with such small electro-mechanical transducer.

Further, it is necessary to maintain a head-touch of the magnetic heads with respect to the magnetic tape acceptably even if the magnetic heads can be displaced considerably by the electro-mechanical transducer. However, it is difficult to realize the VTR capable of performing the recording and reproducing operation by using such small electro-mechanical transducer, and causing the magnetic heads to follow small widths of recorded tracks of the magnetic tape precisely in a high density recording.

In a VTR employing the method (2), particularly, disclosed in Japanese Utility Model Publication No. 63-34126/1988, an arc shaped tape lead for guiding the reference edge of the magnetic tape substantially point contacts with the reference edge thereof. Therefore, a portion of the reference edge which does not contact with the tape lead necessarily becomes very unstable. Although the normal reproduction is possible when the magnetic tape is recorded at a relatively low recording density, that is, when the width of recorded track is relatively large, it is impossible to sufficiently remove noise-bars in the FF or FB reproduction because the reference edge of the magnetic tape is not guided correctly by the tape lead.

On the contrary, in a VTR disclosed in Japanese Utility Model Laid-open Publication No. 61-158633/1986, in which the tape guide member for guiding the reference edge of the magnetic tape over a predetermined distance is provided in a fixed portion of the VTR by being arranged separately from the lower drum, it is possible to remove the positional fluctuation of the reference edge caused in the magnetic recording/reproducing device disclosed in Japanese Utility Model Publication No. 63-34126/1988, during at least the normal reproducing operation.

However, the VTR disclosed in Japanese Utility Model Laid-open Publication No. 61-158633/1986 has a problem as follows:

Upon the FF or FB reproduction, when the upper drum equipped with the magnetic heads and the lower drum are integrally tilted, the reference edge of the magnetic tape running in contact with the surfaces of both the upper and lower drums is displaced apart from the tape guide member, resulting in a fluctuation of the reference edge of the magnetic tape. This fluctuation is apt to cause noise bars in the image obtained.

In a VTR employing the method (3) disclosed in Japanese Patent Publication No. 61-22378/1986, when the heights of the tape guides provided at the tape inlet and outlet sides of the drum assembly are changed so as to cause the magnetic heads to follow the recorded tracks of the magnetic tape, the reference edge of the magnetic tape is guided by a part of the lead, resulting in unstable contact with the lead. This unstable contact is apt to cause a fluctuation of the reference edge of the magnetic tape and noise bars in the image reproduced.

Recently, a width of the recorded locus (a width of recorded track) has been made smaller, in addition to employing a thin tape base having a low stiffness, for both a long time play and a small size of the magnetic tape. Thus, it is impossible to reproduce a high speed reproduction image without noises by using the VTR employing the method (3).

As a countermeasure of resolving the abovementioned problems, the present applicant proposed a VTR in the U.S. Pat. No. 5,504,642.

Next, a description is given of the proposed VTR in detail, referred to FIGS. 1 to 7.

FIG. 1 is a perspective view showing a tape transport system of a VTR in the prior art;

FIG. 2 is a side view, partially in a cross section, of a tilting device for tilting a drum device provided on the tape transport system shown in FIG. 1 in the prior art;

FIG. 3 is an exploded view of the drum device (the drum assembly) shown in FIG. 2 in the prior art;

FIG. 4 is a sectional view of the drum device (drum assembly) along lines in directions of 90°–180° in FIGS. 1 and 2 when the VTR is driven in a normal recording mode in the prior art;

FIG. 5 is a sectional view of the drum device along a line in a direction of 0°–180° in FIGS. 1 and 2 when the VTR is driven in a FF reproduction mode in the prior art;

FIG. 6 (*a*) is a schematic view showing a development of a positional regulation surface of the lead ring (lead) in the normal recording mode in the prior art;

FIG. 6 (*b*) is a schematic view showing a development of a positional regulation surface of the lead ring in the FF reproduction mode in the prior art;

FIG. 6 (*c*) is a schematic view showing a development of a positional regulation surface of the lead ring in the FB reproduction mode in the prior art;

FIG. 7 (*a*) is a schematic view showing a development of a positional regulation surface of the lead ring in the normal recording mode in the prior art, wherein the positional regulation surface is provided with parts capable of guiding the reference edge of the magnetic tape in a high speed reproduction mode;

FIG. 7 (*b*) is a schematic view showing a development of a positional regulation surface of the lead ring in the FF reproduction mode in the prior art, wherein the positional regulation surface is provided with parts capable of guiding the reference edge of the magnetic tape in a high speed forward reproduction mode;

FIG. 7 (*c*) is a schematic view showing a development of a positional regulation surface of the lead ring in the FB reproduction mode in the prior art, wherein the positional regulation surface is provided with parts capable of guiding the reference edge of the magnetic tape in a high speed backward reproduction mode.

In FIG. 1, a reference character DA denotes a drum device in the prior art comprising an upper drum Du, a lower drum Dd provided under the upper drum Du, and a tape running positional regulation member Lr (referred to as lead ring or lead) having a guide member (referred to as positional regulation surface) G provided adjacent to a small diameter section 39 (FIGS. 3, 4, and 5) for guiding a reference edge Te of a magnetic tape T.

Further, in FIG. 1, a reference number 1 denotes a supply tape reel base (deck), 2 a take-up reel base and 3 a cassette case in which the magnetic tape T is wound around a supply reel 4 and a take-up reel 19. When the cassette case 3 is inserted into the VTR, the supply and take-up reels 4, 19 are engaged with the supply and take-up reel bases 1, 2 provided on a chassis 20 of the VTR, respectively.

Then, the magnetic tape T is pulled out by loading poles (vertical or slant tape guide) 9, 10, 13, 14 provided to a loading mechanism employing a parallel loading method and, is displaced so as to be wound around a part of a peripheral surface of the upper drum Du rotated at a certain rotational speed and that of the lower drum Dd stationarily provided on the VTR by displacement of the loading poles 9, 10, 13, 14 while the reference edge Te of the magnetic tape T is guided by the positional regulation surface G of the drum device (drum assembly) DA. As a result, the magnetic tape T forms a tape path between the supply reel 4 and the take-up reel 19 via the upper and lower drums Du, Dd in contact with a tension pole 5, a guide pole 6, a full width erase head 7, an impedance roller 8, the vertical loading pole 9 in the left-hand side with respect to the drum device DA, and in contact with slant guides (slant poles) 10, 13, the vertical loading pole 14, an audio/control head 15, a guide pole 16, a capstan 18 and a pinch roller 17 in the right-hand side with respect to the drum device DA.

In FIG. 2, a reference character 21 denotes a center axis of the upper and lower drums Du, Dd which coaxially passes through centers of the upper and lower drums Du, Db and the lead ring Lr in the normal recording.

Upon the trick play reproduction, the drum device DA is controlled that the center axis 21 of the upper and lower drums Du, Dd is tilted with respect to a drum base DB at a certain amount of angle in directions shown with arrows 21*a*, 21*b* by a tilt control section (not shown) in response to control information about such as a tape running direction and speed corresponding to each operation mode from a main control section provided to the VTR. Further, the lead ring Lr is controlled to be tilted at a certain amount of angle in a certain direction under the control of the main control section. Thereby, the rotary loci of the magnetic heads running on the magnetic tape T can be made to coincide with the recorded tracks on the magnetic tape T, and a transferring locus of the reference edge Te of the magnetic tape T can be made to coincide with the positional regulation surface G of the lead ring Lr.

As mentioned in the foregoing, after the loading operation has been performed by the loading mechanism, the magnetic tape T threads along the tape path defined between the supply reel 4 and the take-up reel 19 in a horizontal level over a first section including the tension pole 5, the guide pole 6, the full width erase head 7, the impedance roller 8, the loading pole 9, and is wound around the outer peripheral surfaces of the upper and lower drums Du, Dd over an angular range of slightly larger than 180° in center angle of the upper and lower drums Du, Dd along the positional regulation surface G of the lead ring Lr by being slanted at a predetermined angle by causing the slant guide (slant pole) 10 to change the running direction of the magnetic tape T.

And, after the running direction of the magnetic tape T wound around the upper and lower drums Du, Dd is again changed in the horizontal level by the slant guide 13, the magnetic tape T threads along the tape path in the horizontal level over a second section including the vertical guide 14, the audio/control head 15, the guide pole 16, the capstan 18 and the pinch roller 17, and is taken up by the take-up reel 19.

In FIG. 1, an arrow "b" denotes a rotary direction of the upper drum Du, and an arrow "a" denotes a normal direction (normal recording direction or forward direction) in a transportation of the magnetic tape T in the first section (forward direction) mentioned above. Needless to say, the normal direction of the magnetic tape T in the second section is an opposite direction to the arrow "a".

Incidentally, in FIGS. 1, 2 a drum motor for rotating the upper drum Du is not depicted for simplicity, however, such drum motor shown in FIGS. 4 and 5 may be used, wherein a rotor of the drum motor is fixed to the upper drum Du and a stator thereof is fixed to a center shaft, and the upper drum Du is rotatably supported by a bearing provided on the center shaft of the drum device DA.

Next, a description is given of an operational principle of a mechanism capable of controlling the rotational loci of the magnetic heads to become an optional angle with respect to the reference edge Te of the magnetic tape T, referring to FIG. 2.

In FIG. 2, a reference character DB is the drum base for supporting the drum device DA thereon. The upper drum Du is rotatably supported by bearings (shown with 51, 52 in FIG. 4) provided between the center shaft 49 (shown in FIGS. 4 and 5) of the drum device DA and the upper drum Du. The lower drum Dd is fixedly secured to the center shaft of the drum device DA. The lead ring Lr for guiding the reference edge Te of the magnetic tape T is provided separated away from the lower drum Dd so as to be adjacent to the outer peripheral surface of the small diameter section 39 of the lower drum Dd in such a manner that knife edge 23 provided in an inner peripheral surface of the lead ring Lr are coaxially engaged with the downward protrusion of the lower drum Dd.

Upon the normal recording operation, the lower drum Dd is supported on the bottom thereof by four rotational fulcrums (referred to as base fulcrums) 25, 26 (35, 36) protrudingly provided on the drum base DB. It should be noted that in FIG. 2 there are depicted only two base fulcrums 25, 26 on the drum base DB, however, other two base fulcrums 35, 36 are depicted in FIG. 3. The base fulcrums 35, 36 are positioned on lines perpendicular to the paper depicted with FIG. 2 corresponding to the positions of the base fulcrums 25, 26.

Referring to FIG. 4, upon the normal recording operation, four rotational fulcrums (referred to as ring fulcrums) 27, 28 (37, 38) protrudingly provided on the lead ring Lr are made to be pressed to the bottom of the lower drum Dd. It should be noted that in FIG. 2 there are depicted only two ring fulcrums 27, 28 on the lead ring Lr, however, other two ring fulcrums 37, 38 are depicted in FIG. 3. The ring fulcrums 37, 38 are positioned on lines perpendicular to the paper depicted with FIG. 2 corresponding to the two ring fulcrums 27, 28. As shown in FIGS. 3, 4 and 5, first springs 44, 45, and second springs 46, 47 are respectively provided between the lead ring Lr and the drum base DB and between the lower drum Dd and the drum base DB. Thereby, the respective components mentioned above are made to hold a predetermined connection state to each other. An example of the connection state of the above components in the normal recording is shown in FIG. 4.

Referring to FIG. 5, upon the FF reproduction of the magnetic tape T running in the same direction as that of the normal recording, a first screw 29 screwed through the drum base DB is driven so as to push the bottom of the lower drum Dd, and a second screw 30 screwed therethrough is driven so as to separate away from the bottom of the lower drum Dd. Thus, two base fulcrums 25, 35 among four butt against the bottom of the lower drum Dd. As a result, the center axis 21 of the upper and lower drums Du, Dd is tilted with respect to the drum base DB in the direction of the arrow 21*a* by causing the base fulcrums 25, 35 to be rotating supporting points. An example of the connection state of the above components in the FF reproduction is depicted in FIG. 5, wherein a reference character 49 denotes the center shaft of the drum device and 21 the center axis of the upper and lower drums Du, Dd.

Upon the FB reproduction of the magnetic tape T running in an opposite direction of the normal recording, the second screw 30 is driven so as to push the bottom of the lower drum Dd, and the first screw 29 is driven so as to separate away from the bottom of the lower drum Dd. Thus, two base fulcrums 26, 36 among four butt against the bottom of the lower drum Dd. As a result, the center axis 21 of the upper and lower drums Du, Dd is tilted with respect to the drum base DB in the direction of the arrow 21*b* (FIG. 2) by causing the base fulcrums 26, 36 to be supporting points.

Such driving operations of the first and second screws 29, 30 are performed by a driving mechanism under a control of a tilt control section (not shown).

Referring to FIG. 3, the driving mechanism comprises a motor 40 as a driving source, a speed reducing mechanism 41 having a plurality of gears, a rotary encoder 42, and a positional detecting device 43.

Thus, the tilt control section controls the driving mechanism to allow the center axis 21 of the upper and lower drums Du, Dd to be tilted by a predetermined amount of angle in a certain direction by rotating the first and second screws 29, 30 upwards and downwards respectively or in opposite directions thereof as mentioned in the above, in response to information from the main control section provided in the VTR, which information is preliminarily established in the main control section based on a tape running direction and a tape speed corresponding to various kinds of operation modes.

Further, a third screw 31 and a fourth screw 32 are screwed through the lead ring Lr so as to touch the bottom of the lower base Dd on the normal recording.

As shown in FIG. 5, upon the FF reproduction, the third and fourth screws 31, 32 are respectively fed in an opposite direction so that the third screw 31 pushes the bottom of the lower drum Dd to allow the ring fulcrums 28 and 38 to separate away from the bottom of the lower drum Dd and the fourth screw 32 separates away from the bottom of the lower drum Dd to allow the ring fulcrums 27, 37 to butt against the bottom of the lower drum Dd by being pushed with the first spring 45. As a result, the center axis of the lead ring Lr is tilted with respect to the drum base DB at a certain amount of angle in the direction of the arrow 21a.

Further, upon the FB reproduction, the third and fourth screws 31, 32 are respectively fed in an opposite direction so that the fourth screw 32 pushes the bottom of the lower drum Dd to allow the ring fulcrums 27 and 37 to separate away from the bottom of the lower drum Dd and the third screw 31 separates away from the bottom of the lower drum Dd to allow the ring fulcrums 28, 38 to butt against the bottom of the lower drum Dd. As a result, the center axis of the lead ring Lr is tilted with respect to the drum base DB at a certain amount of angle in the direction of the arrow 21b.

The driving operation of the third and fourth screws 31, 32 are performed by the abovementioned driving mechanism under the tilt control section.

Thus, the tilt control section controls the driving mechanism to allow the center axis of the lead ring Lr to be tilted by a predetermined amount of angle in a certain direction by rotating the third and fourth screws 31, 32 upwards and downwards respectively or in opposite directions thereof as mentioned in the above, in response to information from the main control section provided in the VTR, which information is preliminarily established in the main control section based on a tape running direction and a tape speed corresponding to various kinds of operation modes as mentioned in the foregoing.

In the above description, there is given such explanation that the tilt operations of both the center axis 21 of the upper and lower drums Du, Dd and the center axis of the lead ring Lr are independently performed.

However, as shown in FIG. 5, each of the first, second, third and fourth screws 29–32 is simultaneously driven by a common power transmission. Accordingly, the tilt operations of the center axis 21 of the upper and lower drums Du, Dd and the center axis of the lead ring Lr are simultaneously performed.

Next a description is given of other components shown in FIGS. 4 and 5, in which a reference character 49 denotes the center shaft fixed on the lower drum Dd, and the bearings 51, 52 are fixed to the center shaft 49. The upper drum Du are rotatably supported by the bearings 51, 52 fixed on the center shaft 49. Reference characters H1, H2 denote magnetic heads provided on the upper drum Du. On the upper drum Du, a rotor 50r of a drum driving motor 50 is fixed. Further, a stator 50s of the drum driving motor 50 is fixed to the center shaft 49. Reference characters 48, 53 denote halves of a rotary transformer respectively provided on the lower drum Dd and the upper drum Du.

In the VTR explained referred to FIGS. 1 to 5, the VTR comprises a first tilting means for tilting the center axis of the upper and lower drum Du, Dd by an angle so that the rotary loci of the magnetic heads H1, H2 coincide with the recorded track formed on the magnetic tape T, a magnetic tape positional regulation guide member (lead ring) Lr provided with the positional regulation surface G for regulating the reference edge Te of the magnetic tape T which lead ring is separately provided adjacent to an outer peripheral surface of the small diameter section 39 formed on the lower end of the lower drum Dd, and a second tilting means for tilting the center axis of the lead ring Lr so as that the reference edge Te of the magnetic tape T coincides with the positional regulation surface G of the lead ring Lr.

Thereby, the rotary loci of the magnetic heads H1, H2 can be made to coincide with the recorded track formed on the magnetic tape T, and the reference edge Te of the magnetic tape T can be fitted to the positional regulation surface G by tilting both the center axis 21 of the upper and lower drums Du, Dd, and the center axis of the lead ring Lr by respective predetermined angles corresponding to the various kinds of the operation modes.

However, in the above VTR, there is a problem that in the trick play reproduction modes such as FF and FB reproduction, an unstable tape running operation is apt to occur when the tape running speed is made much faster than that of the normal recording.

As a result of an experiment for pursuing a cause of the problem, it is found that in the above VTR a development with respect to the positional regulation surface G of the lead ring L for regulating the reference edge Te of the magnetic tape T has an S-letter shape curve because the lead ring Lr is tilted by the predetermined angle by the second tilting means so as to coincide with the reference edge Te of the magnetic tape T, while the center axis 21 of the upper and lower drums Du, Dd is tilted so that the loci of the magnetic heads H1, H2 coincide with the recorded tracks of the magnetic tape by the first tilting means, resulting in that a tilted angle of the center axis of the lead ring Lr is different from that of the upper and lower drums Du, Dd in the trick play reproduction mode.

As a result, the reference edge Te of the magnetic tape T is supported by two points of the S-letter shape curve of the positional regulation surface G, resulting in the unstable tape running operation at a high speed tape running.

Specifically, in the normal reproduction mode where the tape speed and the tape running operation are the same as those of the normal recording mode, the center axis 21 of the upper and lower drums Du, Dd coincides with the center axis of the lead ring Lr. Thus, the development of the positional regulation surface G of the lead ring Lr is linearly depicted as shown in FIG. 6 (a), wherein a reference character Ga denotes a gap between the lower drum Dd and the lead ring Lr, and RF a contacting surface of the lower drum Dd. And, the reference edge Te of the magnetic tape T in the above is securely guided by an overall surface of the positional regulation surface G of the lead ring Lr.

However, upon the trick play reproduction mode, both the center axis of the upper and lower drums Du, Dd and the center axis of the lead ring Lr are tilted with respect to the drum base DB in the direction of the arrow 21a in the FF reproduction mode or 21b in the FB reproduction mode, and the amounts of tilted angles thereof are made different to each other.

Specifically, upon the FF reproduction, the development of the positional regulation surface G of the lead ring Lr has an S-letter shape curve, and the reference edge Te of the magnetic tape T is only in contact with parts P1, P2 of the positional regulation surface G of the lead ring Lr as shown in FIG. 6 (b). Further, upon the FB reproduction, the development of the positional regulation surface G thereof has an S-letter shape curve, and the reference edge Te of the magnetic tape T is only in contact with parts P3, P4 of the positional regulation surface G of the lead ring Lr as shown in FIG. 6 (c).

In FIGS. 6 (a) to 6 (c), angular denotations such as 0°, 45°, 90°, 135°, 180° are represented by central angles of the upper and lower drums Du, Dd. The angle 90° denotes a position at a center of a winding range of the magnetic tape T around the upper and lower drums Du, Dd. The angles 0° and 180° respectively denote a position at the tape inlet side of the magnetic tape T where the magnetic tape begins to be wound, and a position at the tape outlet side of the magnetic tape T where the magnetic tape ends to be wound, when the magnetic tape is transported in the normal forward direction (the normal recording direction).

And, the larger a ratio of a reproduction tape speed to the normal recording tape speed becomes, the larger the curvature of the S-letter shape curve developed with respect to the positional regulation surface G becomes. Accordingly, a contact state of the part P1, P2, P3 or P4 of the lead ring Lr with the reference edge Te of the magnetic tape T comes to a point contact corresponding to a high ratio thereof, resulting in the unstable tape running operation.

The above problem has to be resolved when the content of a recorded tape is desired to be examined during a short time, i.e., at a high tape running speed, as a clear image.

Accordingly, as a countermeasure, the present applicant proposed a VTR having a lead ring Lr having parts P1g, P4g formed on the positional regulation surface G at ends thereof capable of excellently guiding the reference edge Te of the magnetic tape T, as shown in FIGS. 7 (a) to 7 (c), wherein the lead ring Lr is shown as a development.

In FIG. 7 (a), there is shown a development of the positional regulation surface G of the lead ring Lr having the parts P1g and P4g provided at respective ends of the positional regulation surface G for excellently guiding the reference edge Te of the magnetic tape T running at a maximum tape running speed.

The above part P1g is provided at a tape enterring end of the positional regulation surface G to allow the part P1g to coincide with a locus of the reference edge Te of the magnetic tape T running at the maximum tape speed magnification N (N=7 in FIG. 7 (b)) in the normal recording direction as shown in FIG. 7 (b), and the part P4g is provided at a tape entering end of the positional regulation surface G to allow the part P4g to coincide with a locus of the reference edge Te of the magnetic tape T running at the maximum tape speed magnification N (N=7 in FIG. 7(c)) in an opposite direction of the normal recording as shown in FIG. 7 (c).

Thereby, in the VTR mentioned above, the reference edge Te of the magnetic tape T can be guided by both the parts P1g and P2 at the FF reproduction as shown in FIG. 7 (b), and by both the parts P4g and P3 at the FB reproduction as shown in FIG. 7 (c), resulting in a stable tape running at the high speed reproduction.

However, the abovementioned VTR has a disadvantage that it takes an elongated time to precisely form the positional regulation surface G of the lead ring Lr provided with the parts P1g and P4G because of requiring many production process.

SUMMARY OF THE INVENTION

Accordingly, a general object of the present invention is to provide a magnetic recording/reproducing apparatus, in which the above disadvantages have been eliminated.

A specific object of the present invention is to provide a magnetic recording/reproducing apparatus capable of securely guiding the reference edge of the magnetic tape to obtain an reproduced image in high quality without noisebars even when the magnetic tape is driven at a high speed in a trick play reproduction mode.

A more specific object of the present invention is to provide a magnetic recording/reproducing apparatus comprising a lower drum having a first tape contacting area contacting with a magnetic tape, an upper drum having a second tape contacting area contacting with the magnetic tape and a rotary magnetic head for recording and reproducing information signals, the upper drum being coaxially and rotatably supported by the lower drum, first tilt driving means for tilting a center axis of the upper and lower drums at a predetermined angle to allow a rotary locus of the rotary magnetic head to coincide with a recorded track on the magnetic tape, a tape running regulation member having a first tape positional regulation surface for guiding a reference edge of the magnetic tape, the tape running regulation member being independently provided close to an outer peripheral surface of a small diameter section of the lower drum, and second tilt driving means for tilting the first tape positional regulation surface of the tape running regulation member to allow the first tape positional regulation surface thereof to match the reference edge of the magnetic tape, characterized in that a second tape positional regulation surface is at least provided at an end of the first tape contacting area in a tape inlet side of the lower drum for guiding the reference edge of the magnetic tape running at a highest magnification speed with respect to a tape running speed of a normal recording operation.

Another and more specific object of the present invention is to provide a magnetic recording/reproducing apparatus comprising a lower drum having a first tape contacting area contacting with a magnetic tape, an upper drum having a second tape contacting area contacting with the magnetic tape and a rotary magnetic head for recording and reproducing information signals, the upper drum being coaxially and rotatably supported by the lower drum, tilt driving means for tilting a center axis of the upper and lower drums at a predetermined angle to allow a rotary locus of the rotary magnetic head to coincide with a recorded track on the magnetic tape, a tape running regulation member having a first tape positional regulation surface for guiding a reference edge of the magnetic tape, and the tape running regulation member being independently provided close to an outer peripheral surface of a small diameter section of the lower drum, characterized in that a second tape positional regulation surface is at least provided at an end of the first tape contacting area in a tape inlet side of the lower drum for guiding the reference edge of the magnetic tape running at a highest magnification speed with respect to a tape running speed of a normal recording operation.

Other objects and further features of the present invention will be apparent from the following detailed description.

BRIEF DESCRIPTION OF THE DRAWINGS

FIG. 6 (b) is a schematic view showing a development of a positional regulation surface of the lead ring in the FF reproduction mode in the prior art;

FIG. 6 (c) is a schematic view showing a development of a positional regulation surface of the lead ring in the FB reproduction mode in the prior art;

FIG. 7 (b) is a schematic view showing a development of a positional regulation surface of the lead ring in the FF reproduction mode in the prior art, wherein the positional regulation surface is provided with parts capable of guiding the reference edge of the magnetic tape in a high speed reproduction mode;

FIG. 7 (c) is a schematic view showing a development of a positional regulation surface of the lead ring in the FB reproduction mode in the prior art, wherein the positional regulation surface is provided with parts capable of guiding the reference edge of the magnetic tape in a high speed reproduction mode.

DETAILED DESCRIPTION OF THE PREFERRED EMBODIMENT

Figure 1:
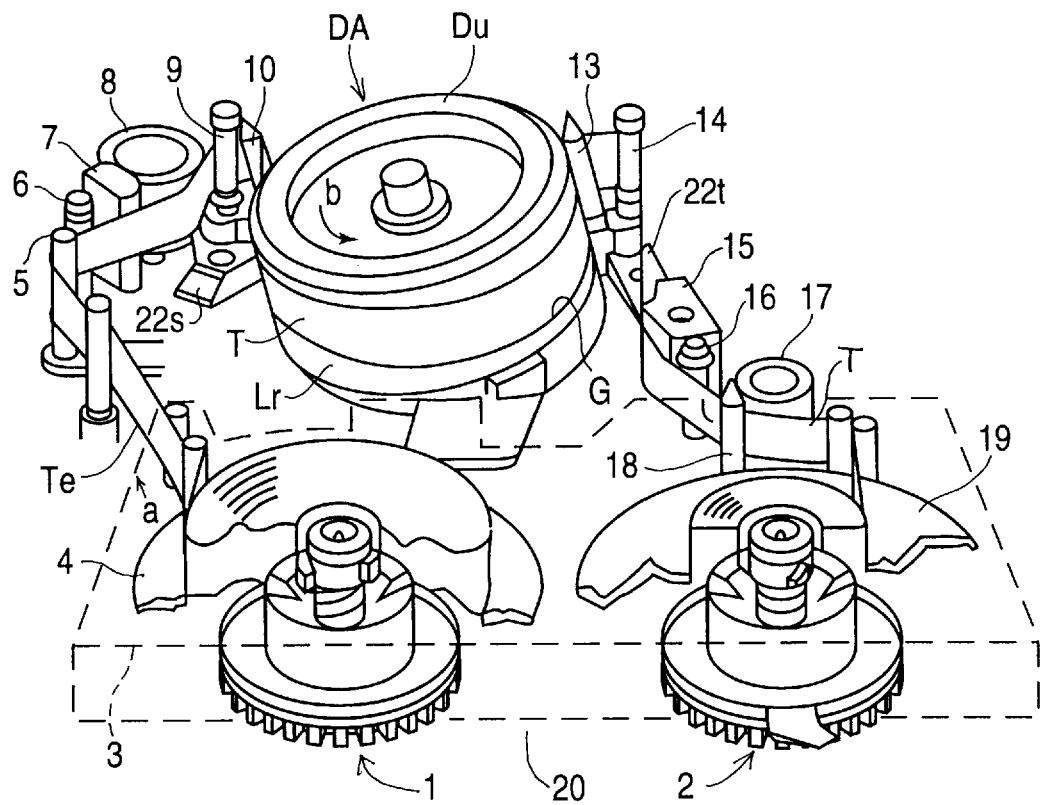
FIG. 1 is a perspective view showing a tape transport system of a VTR in the prior art.
Figure 2:
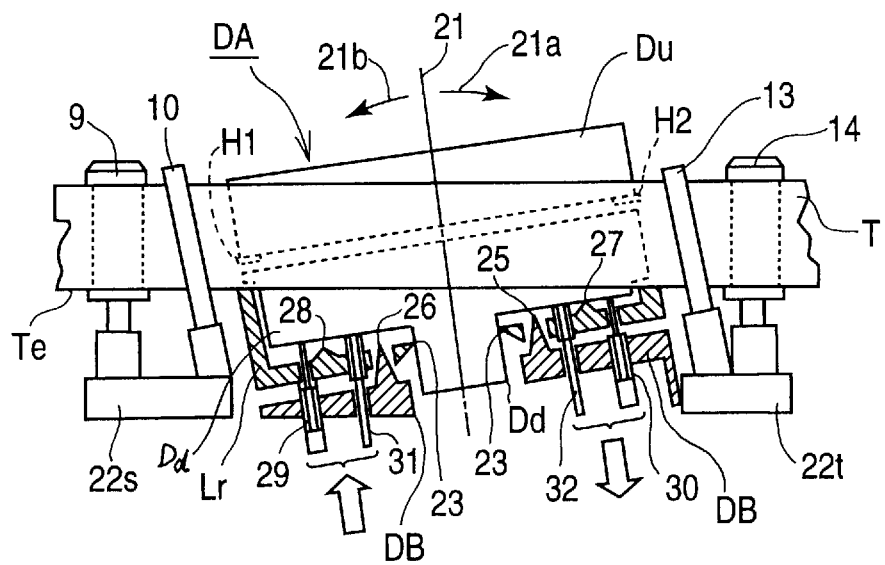
FIG. 2 is a side view, partially in a cross section, of a drum device of the VTR for explaining a tilt driving device of the tape transport system shown in FIG. 1 in the prior art.

Description is now given of a first and second embodiments of a magnetic recording/reproducing apparatus according to the present invention referring to FIGS. 8 to 17, wherein the like reference characters as shown in FIGS. 1 to 7 denote like or corresponding parts throughout the drawings, and detailed descriptions of the like parts are omitted for simplicity except for new parts employed.

[First Embodiment of a Drum Device]

Figure 8:
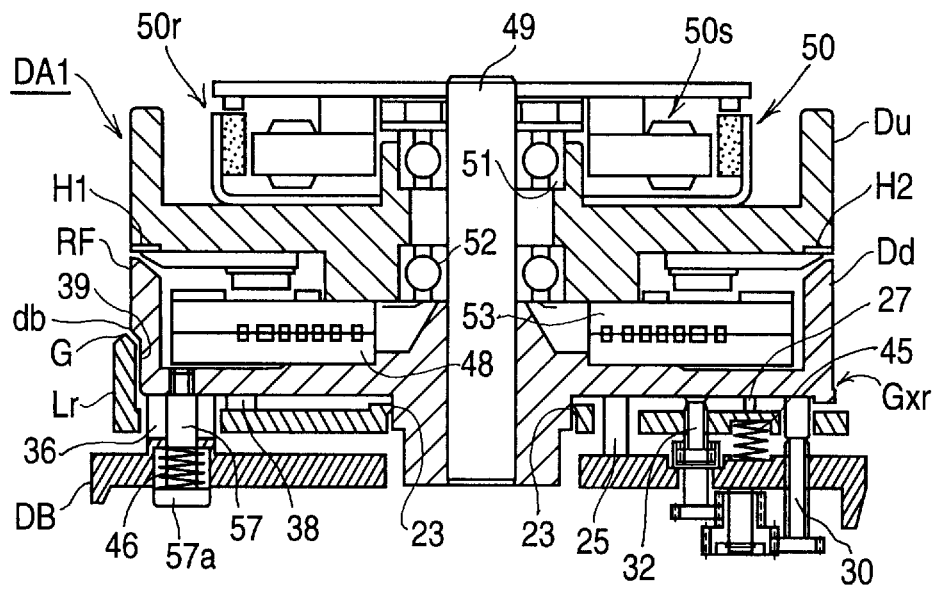
FIG. 8 is a sectional side view showing a drum device of a first embodiment of the present invention along 90°–180° lines with respect a front view of the drum device.
Figure 9:
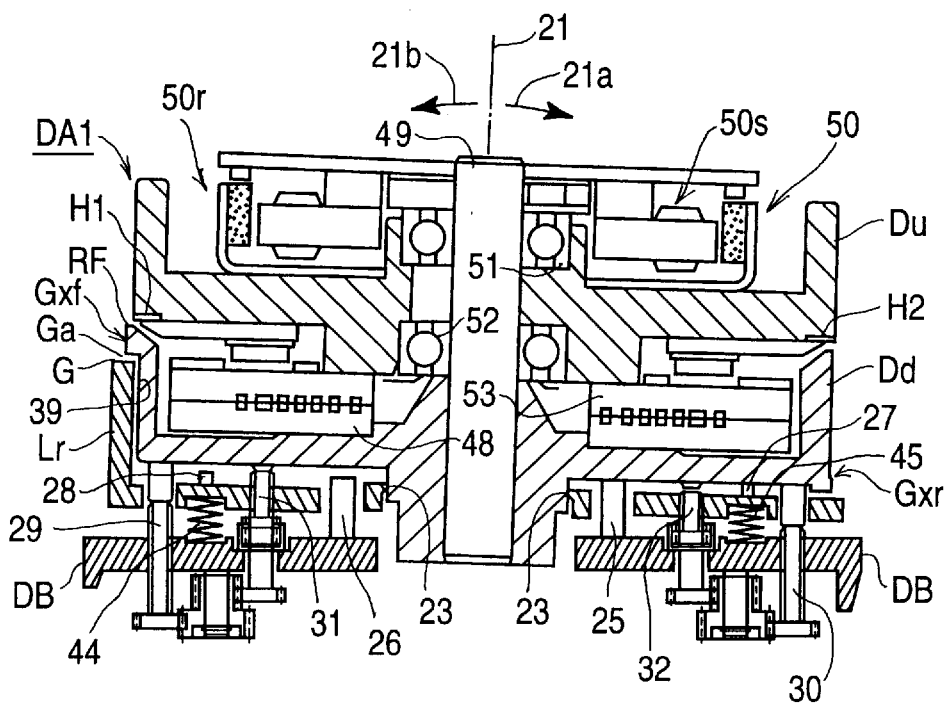
FIG. 9 is a sectional side view showing the drum device of the first embodiment of the present invention along a 0°–180° line with respect to the front view of the drum device.
Figure 10:
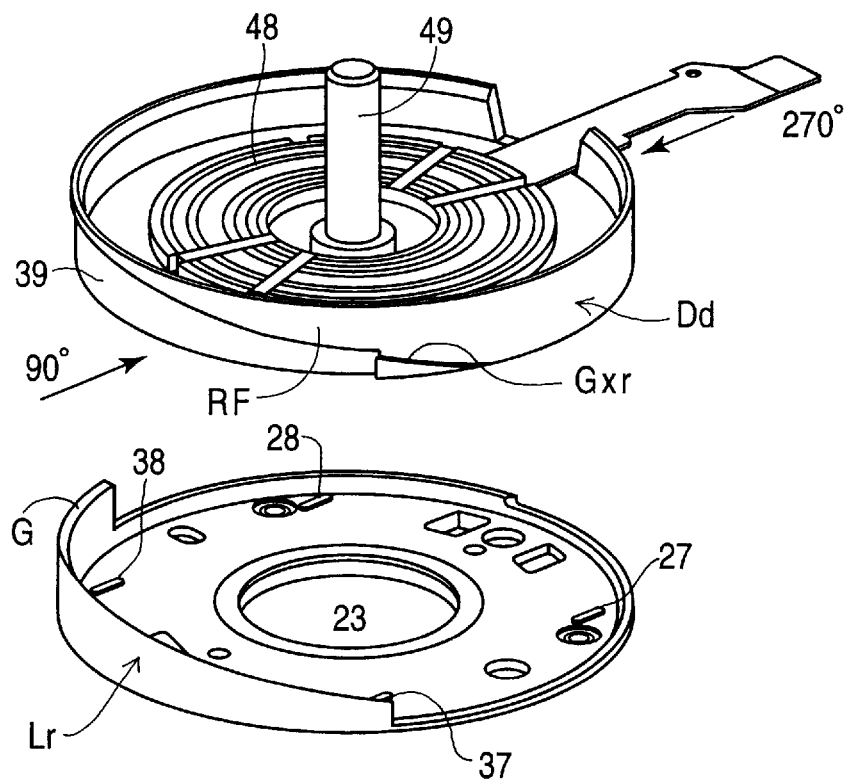
FIG. 10 is an exploded perspective view showing a lower drum and a lead ring shown in FIGS. 8 and 9 in the present invention.

FIG. 8 is a sectional side view showing a drum device of a first embodiment of the present invention along 90°–180° lines with respect a front view of the drum device;

FIG. 9 is a sectional side vide showing the drum device of the first embodiment of the present invention along a 0°–180° line with respect to the front view of the drum device; and FIG. 10 is an exploded perspective view showing a lower drum and a lead ring shown in FIGS. 8 and 9 in the present invention.

Figure 4:
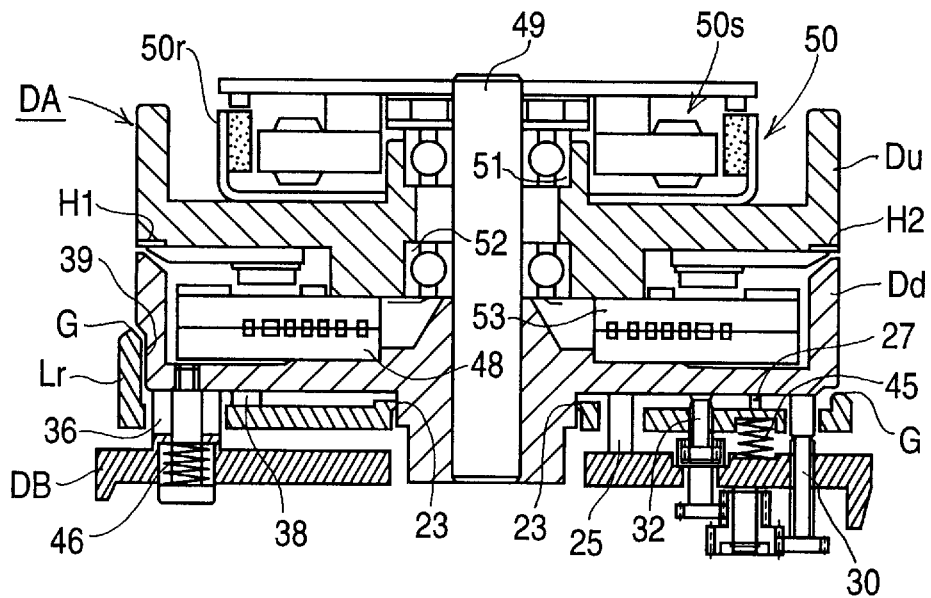
FIG. 4 is a sectional view of the drum device along lines in directions of 90°–180° in FIGS. 1 and 2 when the VTR is driven in a normal recording mode in the prior art.
Figure 5:
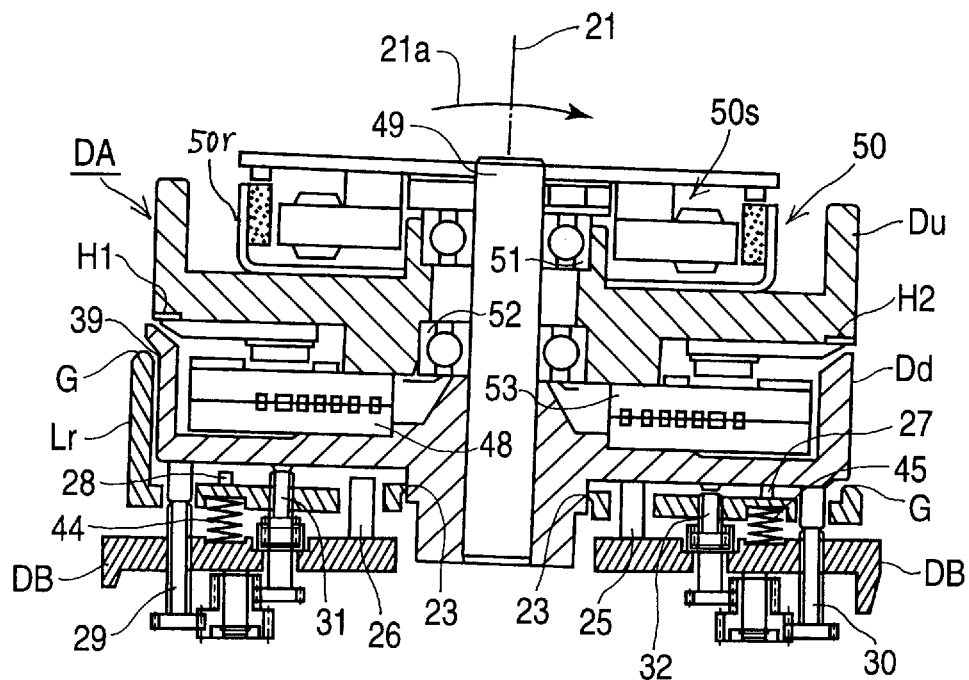
FIG. 5 is a sectional view of the drum device along a line in a direction of 0°–180° in FIGS. 1 and 2 when the VTR is driven in a FF reproduction mode in the prior art.
Figure 6A:
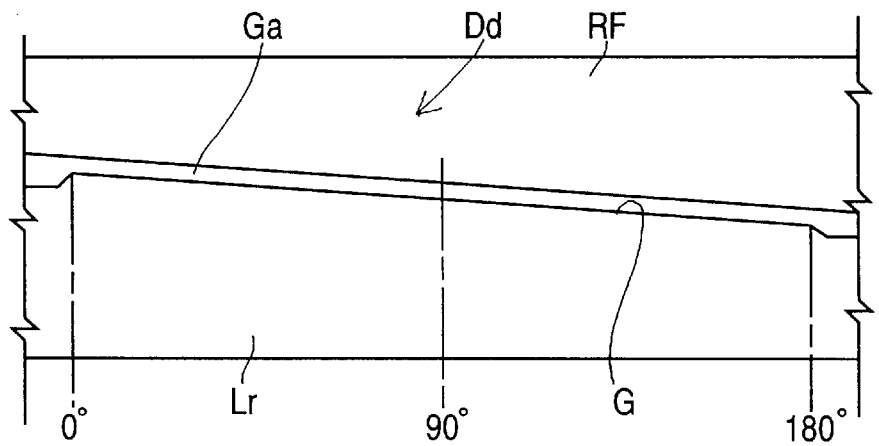
FIG. 6 (a) is a schematic view showing a development of a positional regulation surface of the lead ring in the normal recording mode in the prior art.
Figure 6B:
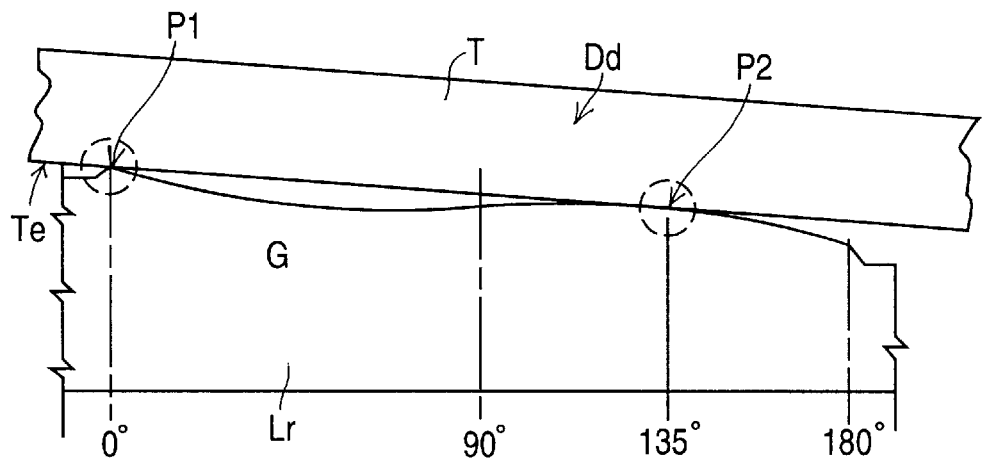
Figure 6C:
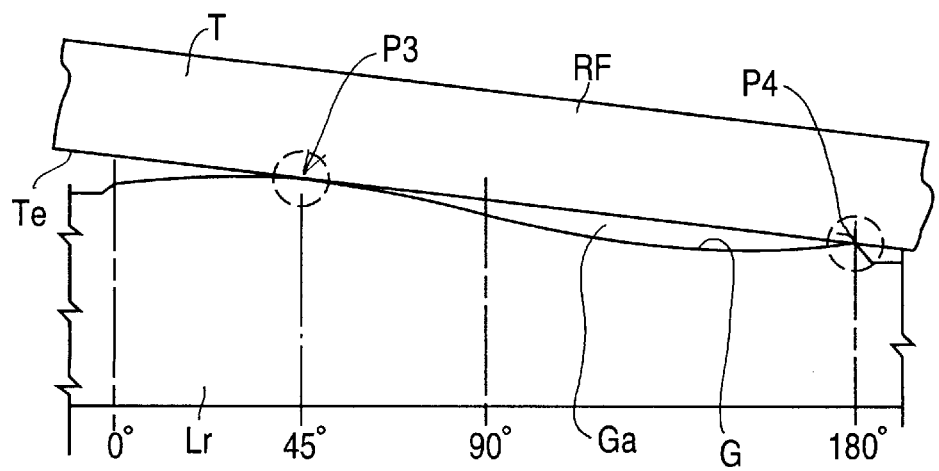
Figure 7A:
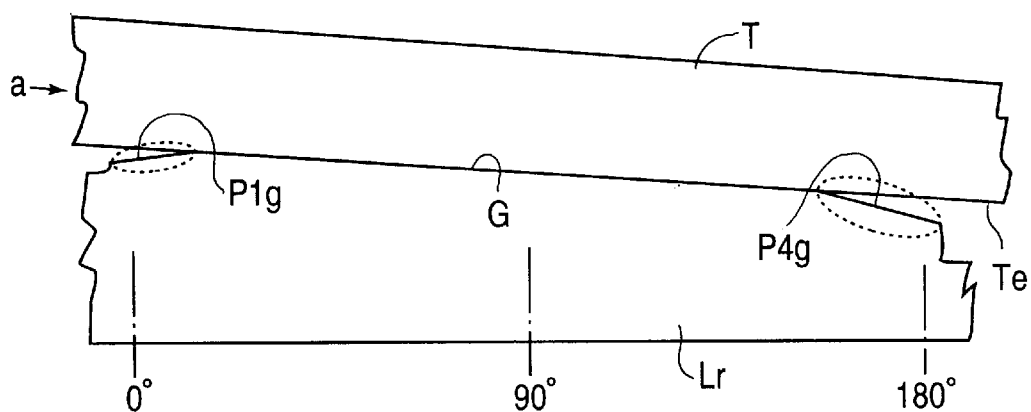
FIG. 7 (a) is a schematic view showing a development of a positional regulation surface of the lead ring in the normal recording mode in the prior art, wherein the positional regulation surface is provided with parts capable of guiding the reference edge of the magnetic tape in a high speed reproduction mode.
Figure 7B:
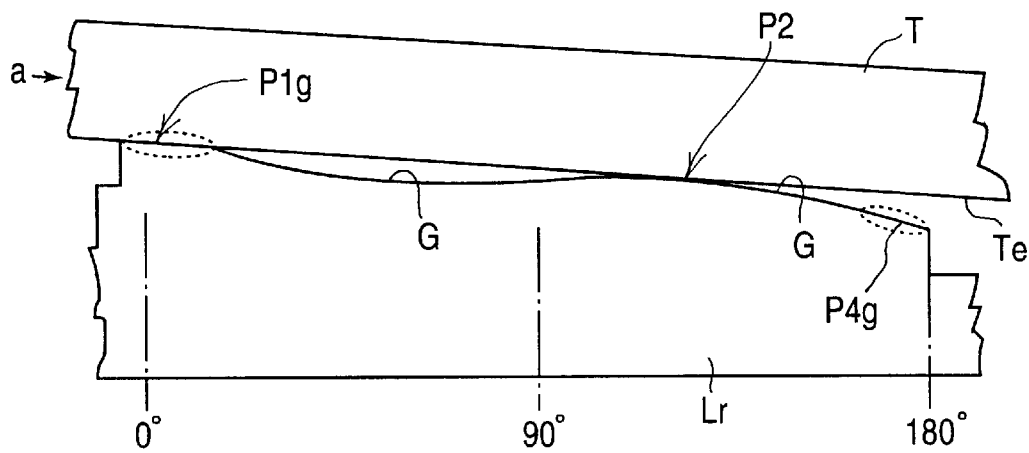
Figure 7C:
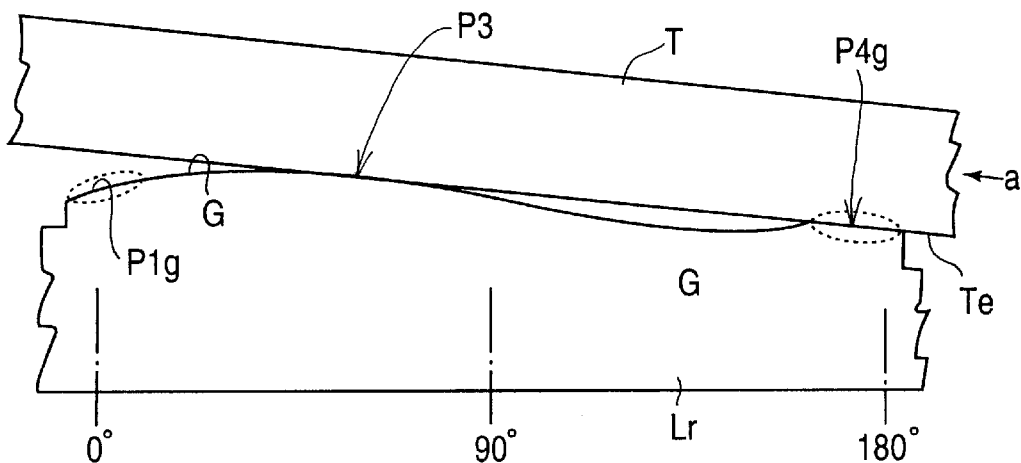

As shown in FIGS. 8 and 9, a drum device DA1 of a first embodiment of the present invention has the same construction as that of the drum device DA mentioned in the prior art referred to FIGS. 4 and 5 except that a lower drum positional regulation surface Gxf (Gxr) is provided at least at an end of a tape contacting area in a tape inlet side of the lower drum Dd to arrow a magnetic tape T to run in a stable manner at a high magnification speed with respect to that of the normal recording in the trick play reproduction as will be mentioned hereinafter.

In FIGS. 8 to 10, angular denotations such as 0°, 90°, 180° are represented by central angles of the lower drum Dd. The angle 90° denotes a position at a center of a winding range of the magnetic tape T around the upper and lower drums Du, Dd. The angles 0° and 180° respectively denote a positioned at the tape inlet side of the upper and lower drums Du, Dd where the magnetic tape T begins to be wound, and a position at the tape outlet side of the upper and lower drums Du, Dd where the magnetic tape ends to be wound, when the magnetic tape is transported in a normal forward direction (a normal recording direction). In FIG. 10, both directions of angles 90° and 270° are exemplarily depicted.

In FIGS. 8 and 9, the bearings 51, 52 are fitted on the center shaft 49 fixedly provided on the lower drum Dd, and the upper drum Du is rotatably supported by the bearings 51, 52 with respect to the center shaft 49. Reference characters H1, H2 denote magnetic heads provided on the upper drum Du. On the upper drum Du, the rotor 50r of a drum driving motor 50 is fixedly provided. Further, the stator 50s of the drum driving motor 50 is fixed to the center shaft 49. Reference character 48 is the lower half of rotary transformer provided on the lower drum Dd, and 53 the upper half rotary transformer provided on the upper drum Du.

Figure 3:
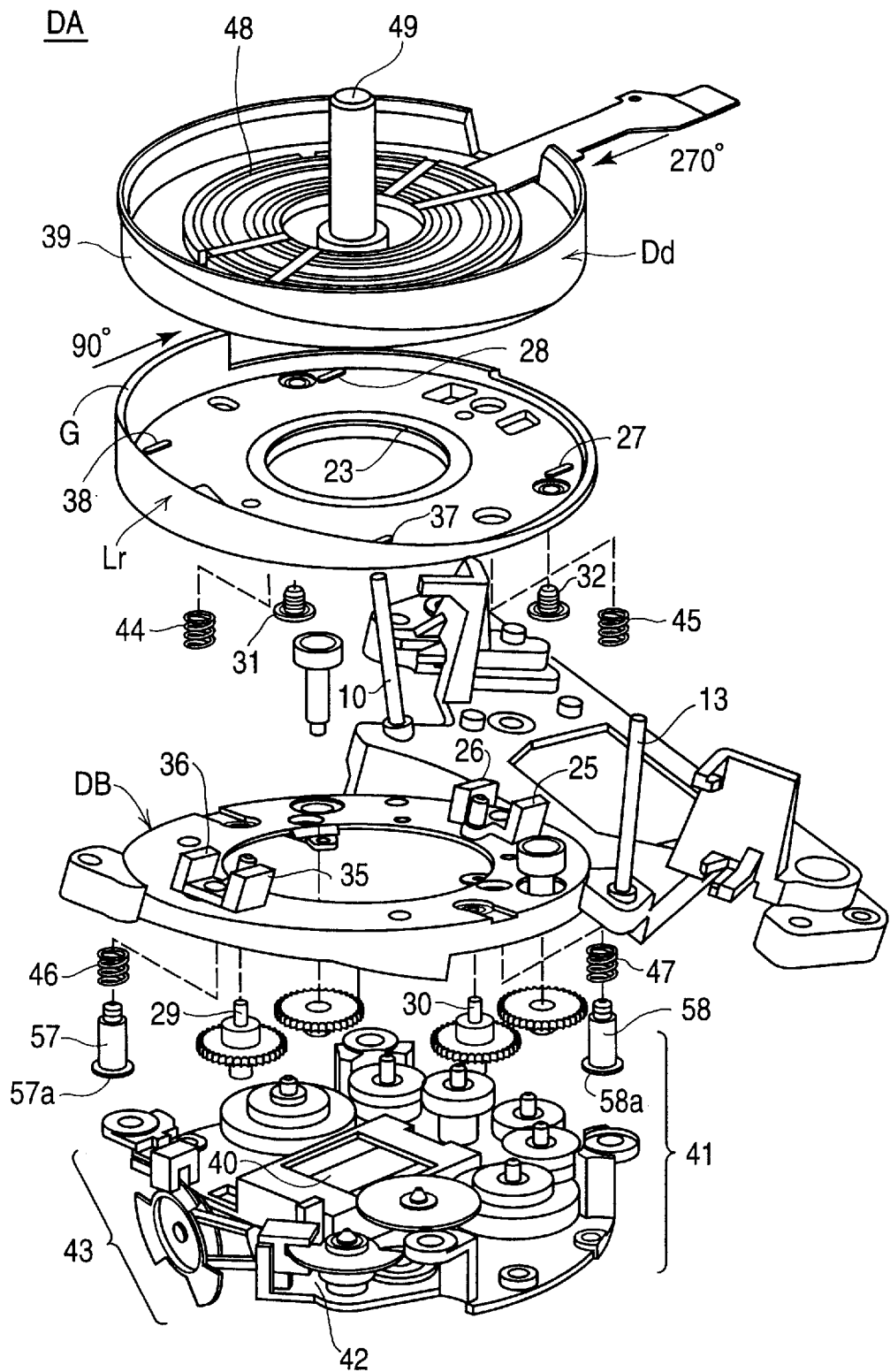
FIG. 3 is an exploded view of the drum device shown in FIG. 2 in the prior art.

Reference character DB denotes the drum base, and four base fulcrums 25, 35, 26, 36 are secured on the drum base DB as shown in FIG. 3. In the foregoing, FIG. 3 is explained as the prior art, however, the components except for the lower drum Dd and the lead ring Lr shown in FIG. 3 are common components used in the magnetic recording/reproducing apparatus of the present invention. Thus, upon explaining the magnetic recording/reproducing apparatus of the present invention shown in FIGS. 8, 9, the FIG. 3 will be referred.

Referring to FIG. 8, upon the normal recording, top ends of all the four base fulcrums 25, 35, 26, 36 secured on the drum base DB are pressed to butt against the bottom of the lower drum Dd by elastic forces of the second springs 46, 47 (FIGS. 8 and 3) by driving the first and second screws 29, 30 screwed through the drum base DB to separate away from the bottom of the lower drum Dd.

Specifically, the second spring 46, (47) is provided in a compressed state between a head 57a (58a) of a stud 57 (58) of which top end is screwed into the lower drum Dd, and an edge of a recess provided in the drum base DB. Thus, the lower drum Dd is elastically forced in the direction of the drum base DB in such a manner that the head 57a of the stud is pushed by the second spring 46 (47). Thus, all the four base fulcrums 25, 35, 26, 36 are pressed to butt against the bottom of the lower drum Dd, so that both the drum base DB and the lower drum Dd are fixed together.

Further, the lead ring Lr which is provided separated away from the lower drum Dd and is coaxially engaged with the downward projection of the lower drum Dd by means of the knife edges 23 thereof, is placed adjacent to the outer peripheral surface of the small diameter section 39 of the lower drum Dd. The lead ring Lr is provided with the four ring fulcrums 27, 37, 28, 38 as mentioned in the foregoing referred to FIG. 3. It should be noted that the above lead ring Lr has the same construction as that shown in FIG. 3.

As shown in FIG. 8, upon the normal recording of the recording/reproducing apparatus, the third and fourth screws 31, 32 screwed through the lead ring Lr are driven so as to be separated from the bottom of the lower drum Dd. Thus, top ends of all the ring fulcrums 27, 37, 28, 38 are pressed to butt against the bottom of the lower drum Dd by elastic forces of the first springs 44, 45 (FIGS. 3 and 9). Thereby, all the upper and lower drums Du, Dd and the lead ring Lr are made to be integrally fixed.

Upon the FF reproduction, the first screw 29 is driven to push the bottom of the lower drum Dd, while the second screw 30 is driven to be separated from the bottom of the lower drum Dd, resulting in that the center axis 21 of the upper and lower drums Du, Dd is tilted with respect to the drum base DB in the direction of the arrow 21a (FIG. 9) by causing the two base fulcrums 25, 35 to be rotating supporting points.

Further, upon the FB reproduction, the second screw 30 is driven to push the bottom of the lower drum Dd, while the first screw 29 is driven to be separated from the bottom of the lower drum Dd, resulting in that the center axis 21 of the upper and lower drums Du, Dd is tilted with respect to the drum base DB in the direction of the arrow 21b (FIG. 9) by causing the two base fulcrums 26, 36 to be rotating supporting points.

The driving operations of the first and second screws 29, 30 are performed by a driving mechanism under a control of a tilt control section (not shown).

The driving mechanism is constructed to contain the motor 40 as a driving source, a speed reducing mechanism 41 having a plurality of gears, a rotary encoder 43, and a positional detecting device 42.

Thus, the tilt control section controls the driving mechanism to allow the center axis 21 of the upper and lower drums Du, Dd to be tilted by a predetermined amount of angle in a certain direction by rotating the first and second screws 29, 30 upwards and downwards respectively or in opposite directions thereof as mentioned in the above, in response to information from the main control section provided in the VTR, which information is preliminarily established in the main control section based on a tape running direction and a tape speed corresponding to various kinds of operation modes.

Further, the third screw 31 and the fourth screw 32 are screwed through the lead ring Lr so as to abut on the bottom of the lower base Dd on the normal recording.

As shown in FIG. 9, upon the FF reproduction, the third and fourth screws 31, 32 are respectively fed in opposite directions so that the third screw 31 pushes the bottom of the lower drum Dd to allow the ring fulcrums 28 and 38 to separate away from the bottom of the lower drum Dd and the fourth screw 32 separates away from the bottom of the lower drum Dd to allow the ring fulcrums 27, 37 to abut on the bottom of the lower drum Dd by being pushed with the spring 45. As a result, the center axis of the lead ring Lr is tilted at a certain amount of angle in the direction of the arrow 21a.

Further, upon the FB reproduction, the third and fourth screws 31, 32 are respectively fed in opposite directions so that the fourth screw 32 pushes the bottom of the lower drum Dd to allow the ring fulcrums 27 and 37 to separate away from the bottom of the lower drum Dd and the third screw 31 separates away from the bottom of the lower drum Dd to allow the ring fulcrums 28, 38 to abut on the bottom of the lower drum Dd. As a result, the center axis of the lead ring Lr is tilted with respect to the drum base DB at a certain amount of angle in the direction of the arrow 21b.

The driving operation of the third and fourth screws 31, are performed by the abovementioned driving mechanism under the tilt control section.

Thus, the tilt control section controls the driving mechanism to allow the center axis of the lead ring Lr to be tilted by a predetermined amount of angle in a certain direction by rotating the third and fourth screws 31, 32 upwards and downwards respectively or in opposite directions thereof as mentioned in the above, in response to information from the main control section provided in the VTR, which information is preliminarily established in the main control section based on a tape running direction and a tape speed corresponding to various kinds of operation modes as mentioned in the foregoing.

In the above description, there is given such explanation that the tilt operations of both the center axis 21 of the upper and lower drums Du, Dd and the center axis of the lead ring Lr are independently performed.

However, as shown in FIGS. 8, 9, each of the first, second, third and fourth screws 29–32 is simultaneously driven by a common power transmission. Accordingly, the tilt operations of the center axis 21 of the upper and lower drums Du, Dd and the center axis of the lead ring Lr are simultaneously performed.

As mentioned in the foregoing referred to FIGS. 3, 8 and 9, in the drum device DA1 of the first embodiment, the center axis 21 of the upper and lower drums Du, Dd is tilted by the first tilt device at a predetermined angle in such that the loci of the magnetic heads H1, H2 are expected to coincide with the recorded tracks on the magnetic tape T, and the center axis of the lead ring Lr having the positional regulation surface G is tilted by the second tilt device so that the positional regulation surface G coincides with the reference edge Te of the magnetic tape T, according to the various kinds of reproduction modes.

Thus, upon the trick play reproduction, the center axis 21 of the upper and lower drums Du, Dd and the center axis of the lead ring Lr are different to each other. As a result, the development of the positional regulation surface G of the lead ring LR has the S-letter shape curve, resulting in that the reference edge Te of the magnetic tape T is supported by only the two points of the S-letter shape curve thereof as mentioned in the foregoing.

Therefore, in the drum device DA1 of the first embodiment of the present invention shown in FIGS. 8 and 9, the lower drum positional regulation surface Gxf (Gxr) is provided at least at an end of a tape contacting area in an tape inlet side of the lower drum Dd to arrow a magnetic tape T to run in a stable manner at a high magnification speed to that of the normal recording in the trick play reproduction mode.

Referring to FIGS. 8 to 10, the reference characters Gxf and Gxr denote the lower drum positional regulation surfaces provided on the lower drum Dd.

The lower drum positional regulation surface Gxf is provided at one end (one end close to the 0° position) of a tape contacting area in an tape inlet side of the lower drum Dd in the same tape running direction as that of the normal recording so as to guide the reference edge Te of the magnetic tape T running at the highest magnification speed compared with the tape speed in the normal recording mode.

The lower drum positional regulation surface Gxr is provided at another end (another end close to 180° position) of the tape contacting area in an tape inlet side of the lower drum Dd in an opposite tape running direction of the normal recording so as to guide the reference edge Te of the magnetic tape T running at the highest magnification speed with respect to the tape speed of the normal recording.

In the present invention, both the lower drum positional regulation surfaces Gxf, Gxr or one of them may be provided.

The highest magnification speed mentioned above is optionally determined like as a 31 magnification speed, a 21 magnification speed or an 11 magnification speed to the normal recording tape speed.

In the first embodiment, the highest magnification speed is determined as the 11 magnification speed as mentioned hereinafter.

Figure 11:
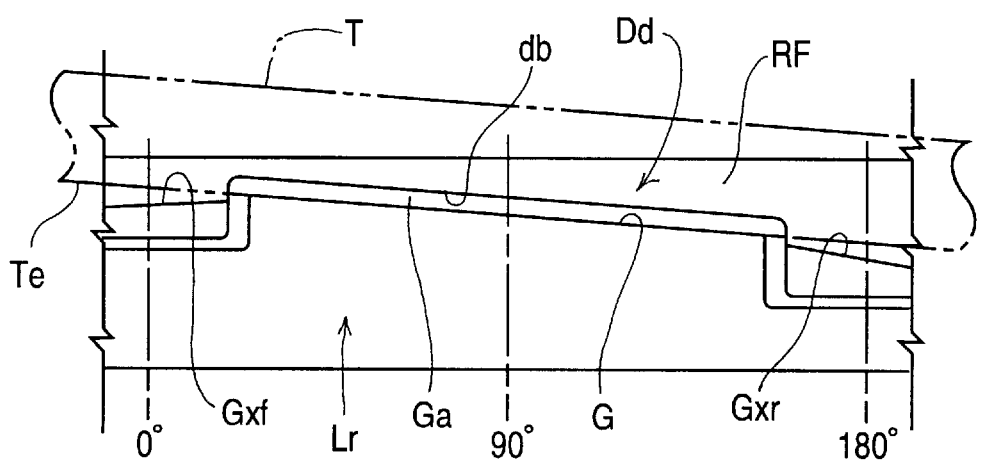
FIG. 11 is a development of a lead ring in the normal reproduction or normal recording mode.
Figure 12:
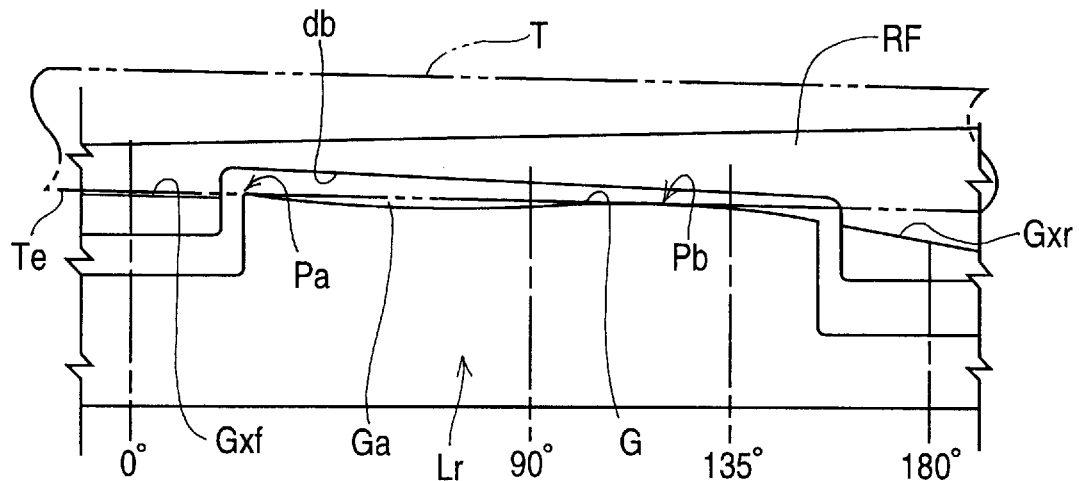
FIG. 12 is a schematic view showing a development of the lead ring at a 7 magnification speed in the FF reproduction mode.
Figure 13:
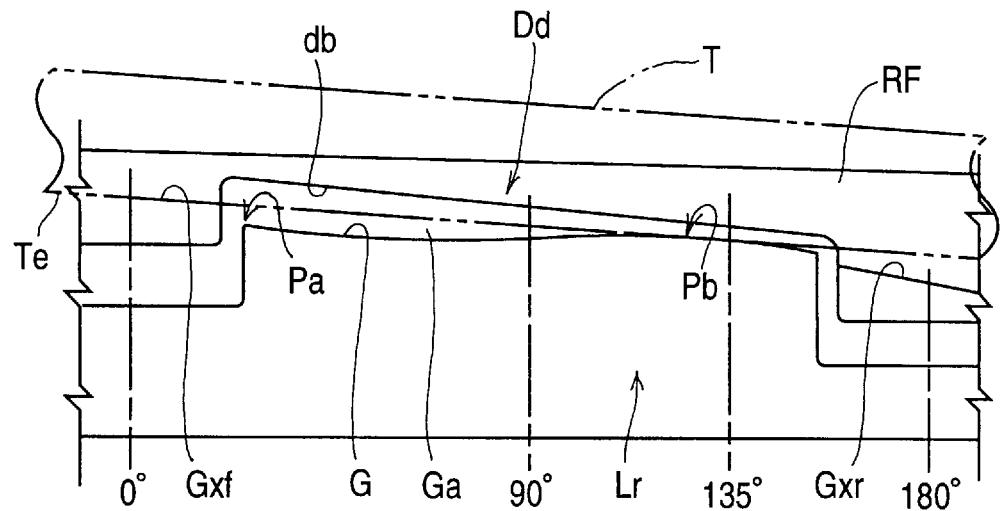
FIG. 13 is a schematic view of a development of the lead ring at a 11 magnification speed in the FF reproduction mode.
Figure 14:
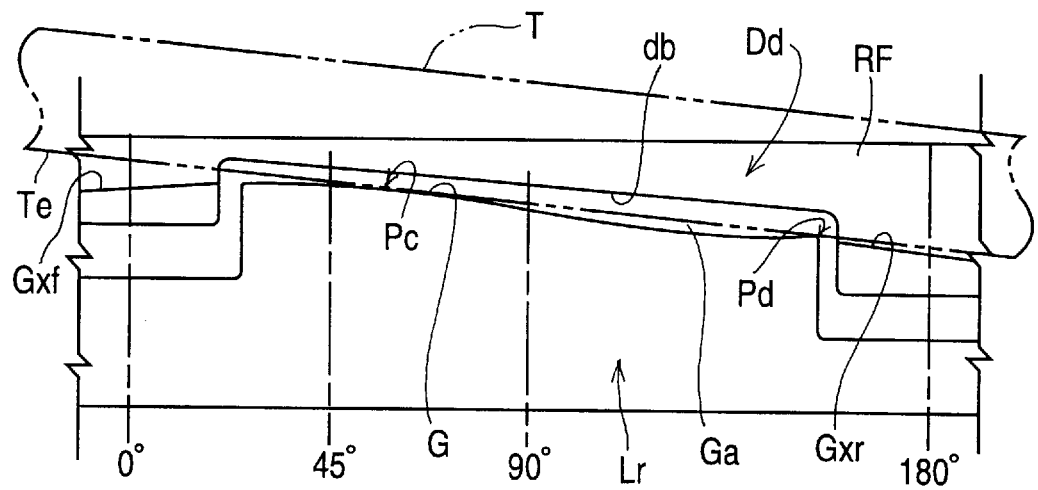
FIG. 14 is a schematic view of a development of the lead ring at a 7 magnification in the FB reproduction mode.
Figure 15:
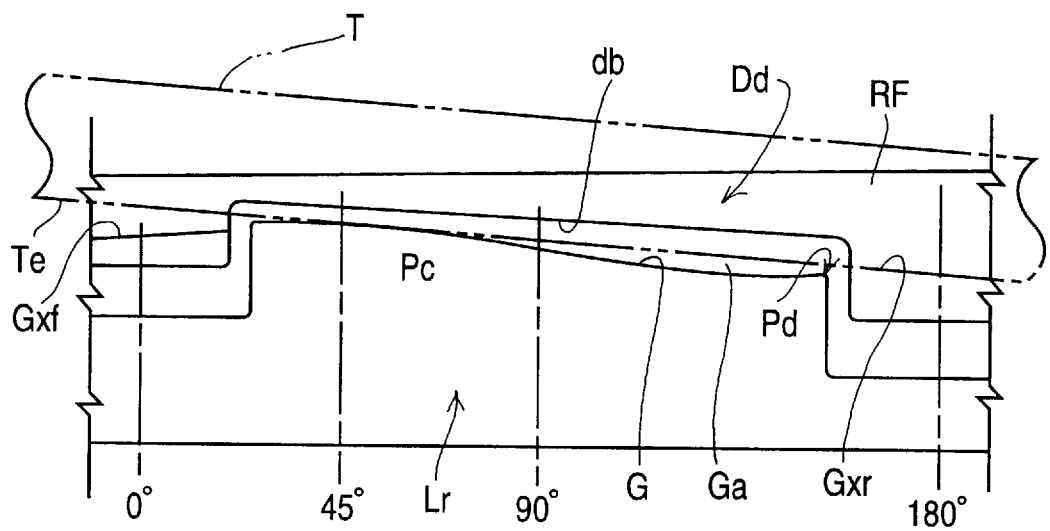
FIG. 15 is schematic view of a development of the lead ring at an 11 magnification speed in the FB reproduction mode.

FIG. 11 is schematic view showing a development of a lead ring in the normal reproduction or the normal recording mode;

FIG. 12 is a schematic view showing a development of the lead ring at a 7 magnification speed in the FF reproduction mode;

FIG. 13 is a schematic view of a development of the lead ring at an 11 magnification speed in the FF reproduction mode;

FIG. 14 is a schematic view of a development of the lead ring at a 7 magnification speed in the FB reproduction mode; and FIG. 15 is schematic view of a development of the lead ring at an 11 magnification in the FB reproduction mode.

Upon the normal reproduction or the normal recording, the center axis 21 of the upper and lower drums Du, Dd coincides with the center axis of the lead ring Lr. Thus, the development of the positional regulation surface G of the lead ring Lr has a linear line as depicted in FIG. 11.

Thus, the reference edge Te of the magnetic tape T (depicted with two-dotted chain lines) is correctly guided by the overall positional regulation surface G of the lead ring Lr.

In FIG. 11, a reference character Ga denotes a gap between the lead ring Lr and the lower drum Dd, and RF the tape contacting area of the lower drum Dd, and db a lower edge of the tape contacting area RF of the lower drum Dd, and Gxf the lower drum positional regulation surface for guiding the reference edge Te of the magnetic tape T entering to the tape inlet side of the lower drum Dd at the 11 magnification speed in the normal reproduction, and Gxr the lower drum positional regulation surface for guiding the reference edge Te of the magnetic tape T entering to the tape inlet side of the lower drum Dd at the 11 magnification speed in the opposite direction of the normal reproduction as mentioned in the foregoing.

In the trick play reproduction mode, the magnetic recording/reproducing apparatus shown in FIGS. 8, 9 is operated so that both the upper and lower drums Du, Dd and the lead ring Lr are tilted in the direction of the arrow 21a on the FF reproduction and 21b at the FB reproduction. Thus, amounts of the tilt angles are increased as the running speed of the magnetic tape is increased. Further, the tilt angles of the upper and lower drums Du, Dd and the lead ring Lr are different from each other, resulting in that the development of the positional regulation surface G of the lead ring Lr has the curve of the S-letter shape shown in FIG. 12 corresponding to the tape running speed as mentioned in the foregoing.

Specifically, the development of the positional regulation surface G of the lead ring Lr at a 7 magnification speed of the FF reproduction has a curve of the S-letter shape as depicted in FIG. 12, and the development of the positional regulation surface G thereof at an 11 magnification speed of the FF reproduction has a curve of the S-letter shape as depicted in FIG. 13.

In the development of the positional regulation surface G at the 7 magnification speed of the FF reproduction in FIG. 12, the transferring locus of the reference edge Te of the magnetic tape T shown with a two-dotted chain line is contacted with the positional regulation surface G of the lead ring Lr at two positions Pa, Pb, while at the 7 magnification speed of the FB reproduction, the transferring locus of the reference edge Te of the magnetic tape T shown with a two-dotted chain line is contacted with the positional regulation surface G of the lead ring Lr at two positions Pc, Pd, as shown in FIG. 14.

And, in the FF and FB reproductions of the 7 magnification speed, both the lower drum positional regulation surface Gxf for preliminarily guiding the tape reference surface Te of the magnetic tape T at the 11 magnification speed in the FF reproduction and the one Gxr for preliminarily guiding the tape reference surface Te thereof at the 11 magnification speed in the FB reproduction does not cause any adverse effect to the magnetic tape T because they are positioned away from the transferring locus of the magnetic tape T running at the 7 magnification speed in the FF and FB reproductions.

However, in a state where the magnetic recording/reproducing apparatus is operated at the 11 magnification speed in the FF reproduction, the lower drum positional regulation surface Gxf coincides with the transferring locus of the tape referring edge Te of the magnetic tape T because the tilt angles of both the upper and lower drums Du, Dd and the lead ring Lr are made larger than the tilt angles thereof at the 7 magnification speed in the FF reproduction. Thereby, the reference edge Te of the magnetic tape T is securely guided at the lower drum positional regulation surface Gxf of the lower drum Dd and the part Pb of the positional regulation surface G of the lead ring Lr, as shown in FIG. 13.

Further, in a state where the magnetic recording/reproducing apparatus is operated at the 11 magnification speed in the FB reproduction, the lower drum positional regulation surface Gxr coincides with the transferring locus of the tape referring edge Te of the magnetic tape T because the tilt angles of both the upper and lower drums Du, Dd and the lead ring Lr are made larger than the tilt angles thereof at the 7 magnification speed in the FB reproduction. Thereby, the reference edge Te of the magnetic tape T is securely guided at the lower drum positional regulation surface Gxr of the lower drum Dd and the part Pc of the positional regulation surface G of the lead ring Lr, as shown in FIG. 15.

As mentioned in the foregoing, the development of the positional regulation surface G of the lead ring Lr has the larger curvature of the S-letter shape curve as the ratio of the reproduction tape speed to the normal recording tape speed is increased. Thus, the contact state between the positional regulation surface G of the lead ring Lr and the reference edge Te of the magnetic tape T comes to become a point contact as the ratio of reproduction tape speed to the normal recording tape speed is increased, resulting in an unstable tape running state.

However, according the drum device DA1 of the first embodiment in the present invention, the lower drum positional regulation surfaces Gxf, Gxr for guiding the reference edge Te of the magnetic tape T running at the highest magnification speed are provided at ends of the tape contacting area RF in the magnetic tape inlet side of the lower drum. Thereby, it is possible to securely guide the reference edge Te of the magnetic tape T running at the highest magnification speed, resulting in an reproduced image without noise-bars.

[Second Embodiment]

Figure 16:
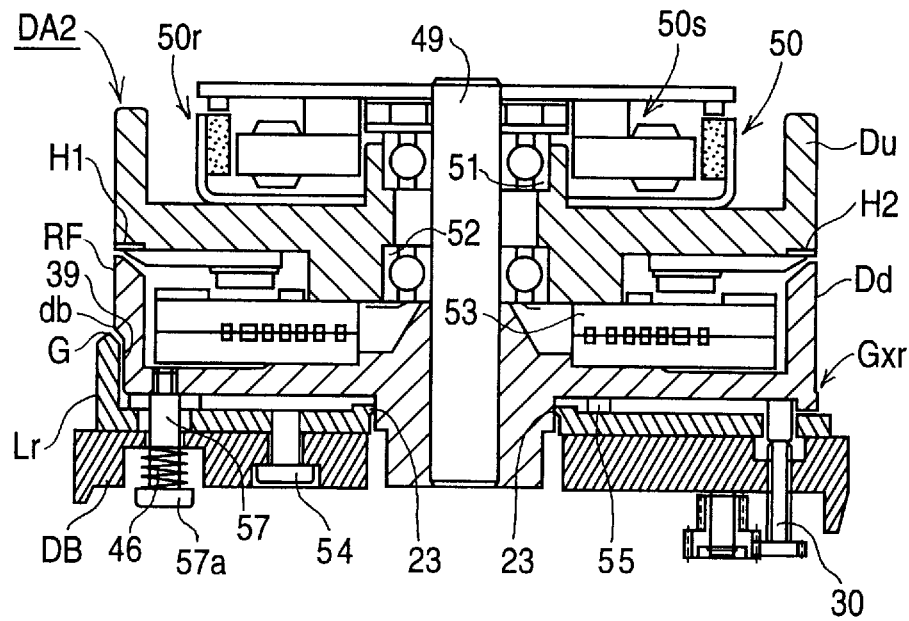
FIG. 16 is a sectional side view of a drum device of a second embodiment of the present invention along 90°–180° lines.
Figure 17:
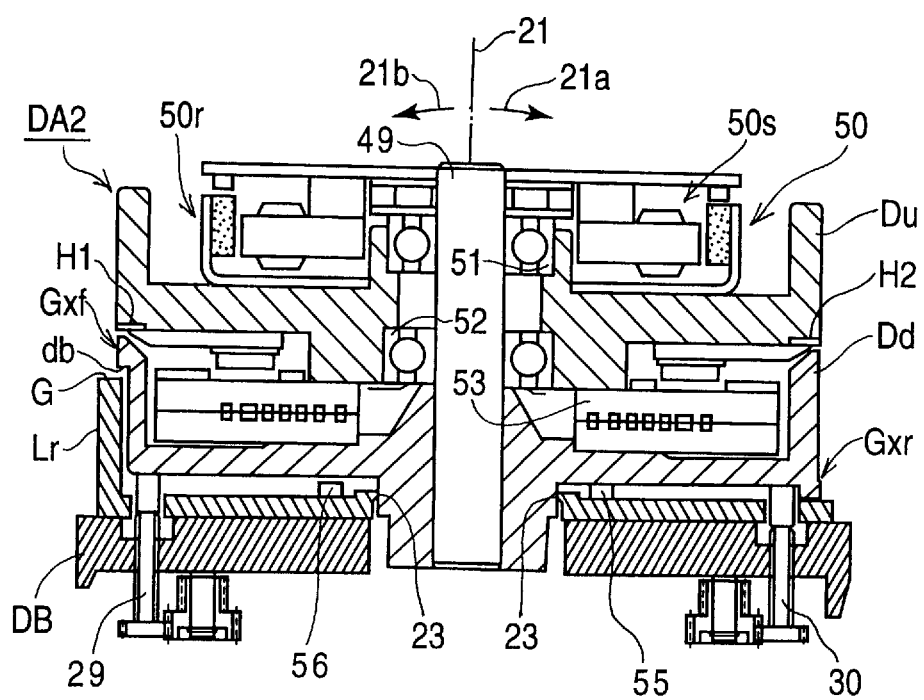
FIG. 17 is a sectional side view of a drum device of the second embodiment of the present invention along a 0°–180° line.

FIG. 16 is a sectional side view of a drum device of a second embodiment of the present invention along a 90°–180° line; and FIG. 17 is a sectional side view of a drum device of the second embodiment of the present invention along a 0°–180° line.

Drum device DA2 of a second embodiment of the present invention has the same construction as the drum device DA1 of the first embodiment shown in FIGS. 8, 9 except that the drum device DA2 has not the tilt driving mechanism of the lead ring Lr. In other words, the lead ring Lr of the drum device DA2 is not tilted on the high speed reproduction so that the positional regulation surface G of the lead ring Lr coincides with the locus of the reference edge Te of the magnetic tape T, while the upper and lower drums Du, Dd are tilted as mentioned in the first embodiment of the drum device DA1.

In FIGS. 16 and 17, a reference character DB denotes the drum base, and the lead ring Lr is independently provided adjacent to an outer peripheral surface of a small diameter section of the lower drum Dd by being fixed on the drum base DB by a screw 54. On the lead ring Lr, there are provided four fulcrums 55, 56, . . . , however, only two fulcrums 55, 56 are depicted in FIG. 17, wherein a section of the drum device DB2 along the 0°–180° line is depicted. Other two fulcrums (not shown) are provided at positions corresponding to the two fulcrums 55, 56 in a perpendicular direction of a paper of the FIG. 17.

As shown in FIG. 16, upon the normal recording, both the first and second screws 29, 30 screwed through the drum base DB are driven so as to be separated from the bottom of the lower drum Dd. Thus, the distal ends of all the four fulcrums 55, 56, . . . , are pressed to butt against the bottom of the lower drum Dd by the elastic forces of the second springs 46 . . . , resulting in an integrated state of the upper and lower drums Du, Dd and the lead ring Lr in the same manner as mentioned referred to FIG. 8.

As shown in FIG. 17, upon the FF reproduction operation, the first screw 29 is driven so as to push the bottom of the lower drum Dd, while the second screw 30 is driven so as to be separated from the bottom thereof. Thus, the center axis 21 of the upper and lower drums Du, Dd is tilted with respect to the drum base DB in the direction of the arrow 21a (FIG. 17) by causing the two fulcrums 55, . . . to be the rotating points.

Upon the FB reproduction operation, the second screw 30 is driven so as to push the bottom of the lower drum Dd, while the first screw 29 is driven so as to be separated from the bottom thereof. Thus, the center axis 21 of the upper and lower drums Du, Dd is tilted with respect to the drum base DB in the direction of the arrow 21b (FIG. 17) by causing the two fulcrums 56, . . . to be the rotating points.

The driving operations of the first and second screws 29, 30 are operated by a driving mechanism under the control of a tilt control section. The driving mechanism is comprised of the motor 40 as the driving source, the speed reducing mechanism 41 having a plurality of gears, the rotary encoder 43, and the positional detecting device 42 as mentioned in the foregoing referred to FIG. 3.

Thus, the tilt control section controls the driving mechanism to allow the center axis 21 of the upper and lower drums Du, Dd to be tilted by a predetermined amount of angle in a certain direction by rotating the first and second screws 29, 30 upwards and downwards respectively or in opposite directions thereof as mentioned in the above, in response to information from the main control section provided in the VTR, which information is preliminarily established in the main control section based on a tape running direction and a tape speed corresponding to various kinds of operation modes.

Referring to FIGS. 16 and 17, the reference characters Gxf and Gxr denote the lower drum positional regulation surfaces provided on the lower drum Dd.

The lower drum positional regulation surface Gxf is provided at one end (one end close to the 0° position) of the tape contacting area on the tape inlet side of the lower drum Dd so as to guide the reference edge Te of the magnetic tape T running at the highest magnification speed with respect to the normal recording tape speed in the normal recording direction.

The lower drum positional regulation surface Gxr is provided at another end (another end close to 180° position) of the tape contacting area on the tape inlet side of the tape drum Dd so as to guide the reference edge Te of the magnetic tape T running at the highest magnification speed in the opposite normal recording direction.

In the present invention, both the lower drum positional regulation surfaces Gxf, Gxr or one of them may be provided.

The highest magnification speed mentioned above is optionally determined like as a 31 magnification speed, a 21 magnification speed or an 11 magnification speed with respect to the normal recording tape speed.

As seen from the explanation of the drum device DA1 of the first embodiment, it is clear that the lower drum positional regulation surfaces Gxf, Gxr in the drum device DA2 of the second embodiment can securely guide the reference edge Te of the magnetic tape T running at the highest magnification speed in the forward or backward direction in the FF or FB reproduction mode, resulting in a stable tape running operation at the highest magnification speed.

Thus, the detailed explanation thereof is omitted here.

What is claimed is:

1. Magnetic recording/reproducing apparatus comprising a lower drum having a first tape contacting area contacting with a magnetic tape, an upper drum having a second tape contacting area contacting with the magnetic tape and a rotary magnetic head for recording and reproducing information signals, the upper drum being coaxially and rotatably supported by the lower drum, first tilt driving means for tilting a center axis of the upper and lower drums at a predetermined angle to allow a rotary locus of the rotary magnetic head to coincide with a recorded track on the magnetic tape, a tape running regulation member having a first tape positional regulation surface for guiding a reference edge of the magnetic tape, the tape running regulation member being independently provided close to an outer peripheral surface of a small diameter section of the lower drum, and second tilt driving means for tilting the first tape positional regulation surface of the tape running regulation member to allow the first tape positional regulation surface thereof to match the reference edge of the magnetic tape, characterized in that a second tape positional regulation surface is at least provided at an end of the first tape contacting area in a tape inlet side of the lower drum for guiding the reference edge of the magnetic tape running at a highest magnification speed with respect to a tape running speed of a normal recording operation.

2. Magnetic recording/reproducing apparatus comprising a lower drum having a first tape contacting area contacting with a magnetic tape, an upper drum having a second tape contacting area contacting with the magnetic tape and a rotary magnetic head for recording and reproducing information signals, the upper drum being coaxially and rotatably supported by the lower drum, tilt driving means for tilting a center axis of the upper and lower drums on a predetermined angle to allow a rotary locus of the rotary magnetic head to coincide with a recorded track of the magnetic tape, a tape running regulation member having a first tape positional regulation surface for guiding a reference edge of the magnetic tape, and the tape running regulation member being independently provided close to an outer peripheral surface of a small diameter section of the lower drum, characterized in that a second tape positional regulation surface is at least provided at an end of the first tape contacting area in a tape inlet side of the lower drum for guiding the reference edge of the magnetic tape running at a highest magnification speed with respect to a tape running speed of a normal recording operation.

* * * * *